United States Patent
Belz et al.

(10) Patent No.: US 9,247,292 B2
(45) Date of Patent: *Jan. 26, 2016

(54) SYSTEM AND METHOD TO MONITOR A PERSON IN A RESIDENCE WITH USE OF A SET-TOP BOX DEVICE

(71) Applicant: AT & T Intellectual Property I, L.P., Atlanta, GA (US)

(72) Inventors: Steven Belz, Cedar Park, TX (US); James Pratt, Round Rock, TX (US); Paul Van Vleck, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 330 days.

This patent is subject to a terminal disclaimer.

(21) Appl. No.: 13/757,193

(22) Filed: Feb. 1, 2013

(65) Prior Publication Data

US 2013/0145386 A1    Jun. 6, 2013

Related U.S. Application Data

(63) Continuation of application No. 12/579,656, filed on Oct. 15, 2009, now Pat. No. 8,390,462.

(51) Int. Cl.
  *G08B 21/00*     (2006.01)
  *H04N 21/442*    (2011.01)
  *G08B 21/04*     (2006.01)

(52) U.S. Cl.
  CPC ...... *H04N 21/44218* (2013.01); *G08B 21/0423* (2013.01); *G08B 21/0476* (2013.01); *G08B 21/0492* (2013.01)

(58) Field of Classification Search
  CPC .................. H04N 21/44218; G08B 21/0423
  USPC .............. 340/573.1, 539.1–539.15, 540, 500; 702/182; 348/143–159; 725/133, 141, 725/153
  See application file for complete search history.

(56) References Cited

U.S. PATENT DOCUMENTS

| | | | |
|---|---|---|---|
| 6,559,766 B2 | 5/2003 | Mohri |
| 6,989,742 B2 | 1/2006 | Ueno |
| 7,023,341 B2 | 4/2006 | Stilp |
| 2004/0030531 A1 | 2/2004 | Miller et al. |
| 2005/0286686 A1 | 12/2005 | Krstulich |
| 2006/0154642 A1 | 7/2006 | Scannell, Jr. |
| 2007/0085690 A1 | 4/2007 | Tran |
| 2007/0203768 A1 | 8/2007 | Adra |
| 2007/0206741 A1 | 9/2007 | Tiliks et al. |

OTHER PUBLICATIONS

"Non-Final Office Action for U.S. Appl. No. 12/579,656", United States Patent and Trademark Office (USPTO), mailed Jul. 19, 2012, 30 pages.

Belz, Steven; "Notice of Allowance and Fee(s) Due for U.S. Appl. No. 12/579,656", United States Patent and Trademark Office (USPTO), mailed Nov. 2, 2012, 17 pages.

*Primary Examiner* — Jeffery Hofsass
(74) *Attorney, Agent, or Firm* — Toler Law Group, PC

(57) ABSTRACT

A particular method includes receiving, at a set-top box device, an activation request from a monitoring service associated with activation of a video camera coupled to the set-top box device. The activation request is received when one or more alert conditions are satisfied. The method further includes activating the video camera based on a response to a prompt.

20 Claims, 7 Drawing Sheets

SYSTEM AND METHOD TO MONITOR A PERSON IN A RESIDENCE WITH USE OF A SET-TOP BOX DEVICE

PRIORITY CLAIM

This application is a continuation of, and claims priority to, U.S. patent application Ser. No. 12/579,656, filed on Oct. 15, 2009, and entitled "SYSTEM AND METHOD TO MONITOR A PERSON IN A RESIDENCE WITH USE OF A SET-TOP BOX DEVICE," which is hereby incorporated by reference in its entirety.

FIELD OF THE DISCLOSURE

The present disclosure is generally related to monitoring a person in a residence.

BACKGROUND

People in a residence may be monitored for various reasons. For example, some people who are monitored may be elderly or semi-incapacitated people that are monitored to detect mental lapses, accidents, deteriorating health situations, or combinations thereof. In another example, some people who are monitored have their rights restricted under a program, such as home confinement. Some current monitoring techniques use periodic telephone calls to or from people being monitored, in person visits, emergency alert devices activated by the person being monitored, or other electronic devices (e.g., an ankle bracelet) to monitor the person being monitored.

DETAILED DESCRIPTION

A monitoring service to monitor a person in a residence is disclosed. The monitoring service may notify one or more third parties when an alert condition in the residence is detected. For example, a third party may be a relative, legal guardian, medical personnel associated with the person (e.g., a personal physician or a nurse), emergency service providers (e.g., police, firemen, emergency medical technicians, etc.), a parole officer, or others. The monitoring service may provide the third party the ability to view the residence or certain portions thereof when an alert condition is detected. The monitoring service may also provide the person being monitored with the ability to block the third party from viewing the residence or certain portions thereof, so that privacy of the person being monitored is not unduly violated.

In a particular embodiment, a system for monitoring a person in a residence includes a location system in the residence. The location system includes a first component coupled to the person to be monitored and a plurality of second components located in the residence that interact with the first component. The system for monitoring the person in the residence also includes a set-top box (STB) device to receive an output from the location system. The output indicates a location of the person in the residence. Data including the location of the person in the residence and a time stamp of the output are sent from the STB device to a monitoring service. The monitoring service analyzes the data received from the STB device and sends a notification when one or more alert conditions are satisfied.

In a particular embodiment, a method includes receiving data at a monitoring service from a set-top box (STB) device. The data includes a location in a residence of a person being monitored. The data also includes an associated time stamp for the data. The method includes analyzing the data based on a profile of the person to determine whether one or more alert conditions are satisfied. The method also includes providing a notification when the one or more of the alert conditions are satisfied.

In a particular embodiment, a set-top box device includes at least one processor and at least one memory accessible to the at least one processor. The at least one memory includes instructions executable by the at least one processor to receive input from a location system in a residence. The location system is operable to identify a location in the residence of a person being monitored. The at least one memory includes instructions executable by the at least one processor to analyze the input to determine the location of the person and to determine whether the location has changed from previously received input. The at least one memory also includes instructions executable by the at least one processor to send location data, change in location data, and a time stamp to a monitoring service.

Figure 1:
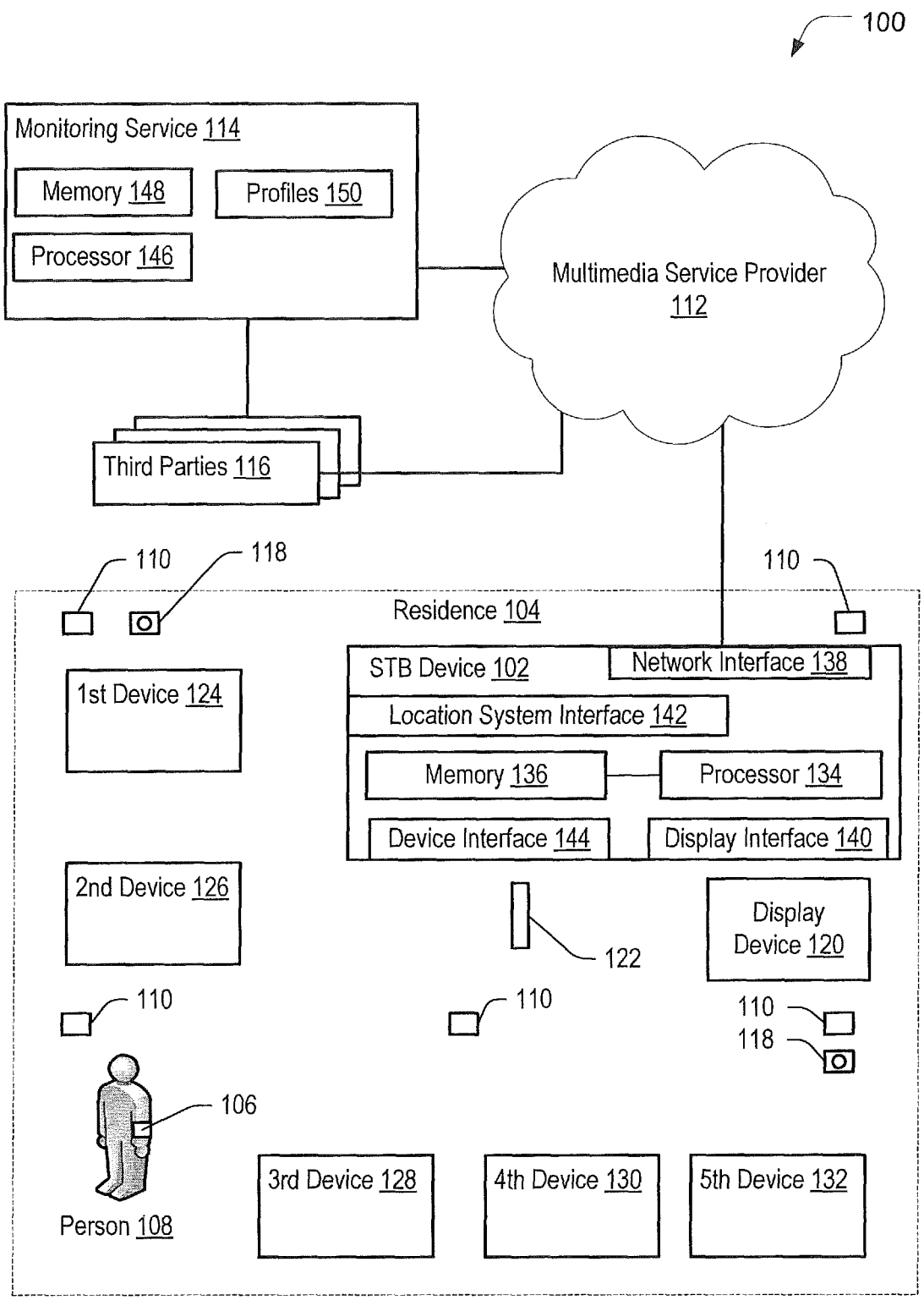
FIG. 1 is a block diagram of a first particular embodiment of a system to monitor a person in a residence.

Referring to FIG. 1, a block diagram of a particular embodiment of a system to monitor a person in a residence is illustrated and designated generally 100. The system 100 may include a set-top box (STB) device 102 in a residence 104 and a location system in the residence 104. The location system may include a first component 106 to be coupled to a person 108 to be monitored and one or more second components 110. A multimedia service provider 112 may provide multimedia services to the residence 104 via the STB device 102. Additionally, a monitoring service 114 may be in communication with the STB device 102. The monitoring service 114 may provide notification to one or more third parties 116 when one or more alert conditions related to the person 108, to the residence 104, or both, are satisfied. In this context, "third party" refers to a party other than the person 108, the multimedia service provider 112, and the monitoring service 114. The third party may include one or more family members, a medical professional (e.g., an on-call nurse, a doctor, an emergency medical services provider, etc.), a legal guardian, a parole officer, or another person who has an interest in the safety and well being or the location of the person 108.

In a particular embodiment, one or more of the third parties 116 may have access through the monitoring service 114, or through the multimedia service provider 112, to video feeds from one or more video cameras 118 in the residence 104 when the one or more alert conditions are satisfied. For example, video feeds may be sent through the STB device 102 when one or more alert conditions are satisfied and when the person 108 does not block activation of the one or more video cameras 118.

The residence 104 may be divided into a number of rooms. For example, the residence 104 may include one or more bedrooms, bathrooms, living rooms, game rooms, hallways, closets, kitchens, utility rooms, garages, and other types of rooms. The STB device 102, at least one display device 120, a plurality of other devices 124-132 (such as appliances and fixtures of the residence 104), a remote control device 122, the one or more video cameras 118, and the location system may be located in various rooms throughout the residence 104.

The at least one display device 120 may receive programming from the multimedia service provider 112 via the STB device 102. The programming may include video programming, audio programming, or both. The at least one display device 120 may be connected by wiring to the STB device 102 or may be wirelessly connected to the STB device 102. In various embodiments, the at least one display device 120 may include a television, a computer monitor, or another type of display device. The remote control device 122 may interact with the STB device 102, the at least one display device 120, or both, to enable selection of various programming or other services available from the multimedia service provider 112. In a particular embodiment, the remote control device 122 includes a microphone. The person 108 may speak commands or responses to the system 100 into the microphone of the remote control device 122. The spoken commands or responses may be converted into digital signals recognizable by the STB device 102 and the system 100.

In a particular embodiment, the plurality of devices 124-132 includes a first device 124, a second device 126, a third device 128, a fourth device 130, and a fifth device 132. In other embodiments, fewer or more devices may constitute the plurality of devices 124-132. The plurality of devices 124-132 may include electrical devices, such as lights, computer systems, fans, washers, dryers, ovens, electrical cooking burners, kitchen appliances, other electrical devices, or any combination thereof. The plurality of devices 124-132 may also include non-electrical devices, such as gas cooking burners, gas heaters, faucets, toilets, showers, bathtubs, other appliances or fixtures of the residence 104. For example, the first device 124 may be a shower, the second device 126 may be a toilet, the third device 128 may be a computer system, the fourth device 130 may be a cooking burner, and the fifth device 132 may be a second display device located in a different room than the display device 120.

In a particular embodiment, one or more of the devices 124-132 are coupled to the STB device 102. Each of the one or more devices 124-132 coupled to the STB device 102 may be coupled by a wired connection or by a wireless connection. The STB device 102 may monitor whether each of the plurality of devices 124-132 is in use or is idle. For devices that are not electrical devices, the connection may include an electrical circuit (such as a sensor) that monitors whether the device is on or off. For example, when the first device 124 is a shower, valves that control water flow may be coupled to electrical circuits that indicate whether the valves are on or off. Alternately, an electrical circuit in a drain may detect the presence or absence of water flow to indicate whether the first device 124 is in use. In some embodiments, one or more of the plurality of devices 124-132 may be remotely controlled through the connection between the devices 124-132 and the STB device 102. For example, a graphical user interface available via the third device 128 (i.e., a computer system) may be used to remotely turn off the fourth device 130 (i.e., a cooking burner) using signals sent from the STB device 102.

The one or more video cameras 118 may be wired or wirelessly coupled to the STB device 102. Selected video cameras 118 may include servomotors that enable adjustment of a view of the selected video cameras 118. The servomotors may be controlled via the STB device 102 from a location external to the residence 104 when the selected video cameras 118 are activated.

Components 106 and 110 of the location system in the residence 104 may be coupled to the STB device 102 wirelessly or by wiring. The location system may send information to the STB device 102 that indicates the location of the person 108 in the residence 104. For example, the first component 106 of the location system may be coupled to the person 108 to be monitored. The first component 106 may be incorporated into an item worn by or carried by the person 108 (e.g., a piece of clothing, a necklace, a ring, an arm band, wrist band, a leg band, an ankle band, etc.). In a particular embodiment, the first component 106 is a Universal Serial Bus (USB) based item attached to the person 108. The USB item may have the capability to transmit location information to the STB device 102.

The first component 106 of the location system may interact with the second components 110. The second components 110 may be distributed at one or more locations throughout the residence 104. For example, the second components 110 may be located in entryways into rooms of the residence 104, within rooms in the residence 104, at other locations within the residence 104, or any combination thereof.

In a particular embodiment, the first component 106 is an emitter (e.g., a radio frequency identification (RFID) emitter) and the second components 110 are detectors (e.g., RFID detectors). The first component 106 may send signals that are detected by one or more of the second components 110 and used to determine the location of the person 108. In another particular embodiment, the first component 106 is a detector that receives signals from one or more of the second components 110 that are emitters. The location system may be a RFID system, a global positioning satellite (GPS) based system, a short range wireless system (e.g., 802.x system, such as a 802.11 (x) system or a Bluetooth® system), another type of location system, or any combination thereof.

In some embodiments, the location system monitors location by determining when the person 108 enters or exits particular rooms within the residence 104. In some embodiments, the location system monitors the location of the person 108 in rooms within the residence 104 based on the strength of signals between the first component 106 and one or more of the nearest second components 110 (e.g., by triangulation). The ability of the location system to determine the location of the person 108 within rooms in the residence 104 may extend the ability of the system 100 to provide information regarding the condition of the person 108 in the residence 104.

The STB device 102 in the residence 104 may include a processor 134, a memory 136, a network interface 138, a display interface 140, a location system interface 142, and a device interface 144. The processor 134 may execute instructions stored in the memory 136 to interact with various components of the system 100. The network interface 138 may facilitate communication between the processor 134 and a multimedia service provider 112. Programming sent from the multimedia service provider 112 may be received by the processor 134 through the network interface 138. The programming or a portion of the programming may be stored in the memory 136 and sent through the display interface 140 to the display device 120.

The location system interface 142 may receive information sent from the location system in the residence 104 to the processor 134. The information may be sent to the STB device 102 from the first component 106, one or more of the second components 110, or from another component of the location system. The processor 134 may add a time stamp and identification information to the information. The processor 134 may process the information. For example, the processor 134 may process the information to determine which room in the residence 104 the person 108 is located and may determine whether the person 108 has moved since the last time the processor 134 received information from the location system. The processor 134 may send information regarding the location of the person 108 in the residence 104 through the network interface 138 to the multimedia service provider 112. The multimedia service provider 112 may pass the information to the monitoring service 114.

The device interface 144 may receive commands from or send commands to the remote control device 122, the video cameras 118, the plurality of devices 124-132, or any combination. For example, the device interface 144 may receive usage information for the remote control device 122, the display device 120, and the plurality of devices 124-132. The processor 134 may add a time stamp and identifiers to the usage information. The processor 134 may send the resulting usage information through the network interface 138 to the multimedia service provider 112. The multimedia service provider 112 may pass the information regarding device usage to the monitoring service 114.

The device interface 144 may receive control signals from the processor 134 for controlling a particular device. The particular device may be one of the video cameras 118, the display device 120, the remote control device 122, or one or more of the plurality of devices 124-132. The control signals may be sent from the device interface 144 to the particular device to change an operating parameter of the particular device. For example, the control signals may be sent from the device interface 144 to a particular video camera of the video cameras 118 to change what is viewed by the particular video camera.

In a particular embodiment, the person 108 is coupled to a biosensor. For example, the biosensor may be a part of the first component 106 of the location system, or the biosensor may be a separate device coupled to the person 108. The biosensor may provide biological information regarding the person 108, including, but not limited to, temperature, blood oxygen content, blood chemistry (e.g., glucose level), heart rate (e.g., using a pulse monitor, an electrocardiography (EKG) system, etc.), other biological indicators, or combinations thereof. The biological information from the biosensor may be sent to the STB device 102. The biological information may be received by the location system interface 142 or the device interface 144 and sent to the processor 134. The processor 134 may add a time stamp and identifiers to the biological information and send the resulting biological information through the network interface 138 to the multimedia service provider 112. The multimedia service provider 112 may pass the resulting biological information to the monitoring service 114.

In a particular embodiment, the data obtained from the biosensor may be stored in a database. Health care personnel may have access to review and to organize the data to determine changes in the data over a period of time (e.g., by the hour, by the day, by the week, etc.). Such monitoring may enable the health care personnel to make timely health care decisions regarding the person 108, such as decisions to adjust medication dosages to accommodate the lifestyle of the person 108.

The multimedia service provider 112 may send information to the STB device 102 in the residence 104. The multimedia service provider 112 may also receive information from the STB device 102. The multimedia service provider 112 may be an Internet Protocol Television (IPTV) system provider, a cable television system provider, or another type of service provider. The multimedia service provider 112 may provide television services, movie rentals, internet services, voice over internet protocol (VOIP) telephone services, or other services to the residence 104 and the person 108. For example, the multimedia service provider 112 may send requested programming to the STB device 102. The programming may be requested using the remote control device 122 or another input device in conjunction with the STB device 102.

In another embodiment, the multimedia service provider 112 may receive information from the location system in the residence 104, one or more of the devices 124-132, one or more of the video cameras 118, or the biosensor via the STB device 102. The multimedia service provider 112 may forward the information to the monitoring service 114. When the monitoring service 114 determines that one or more alert conditions related to the person 108, the residence 104, or both exist, the multimedia service provider 112 may forward a message to the STB device 102 for presentation via a particular device close to the person 108 that is capable of presenting the message to the person 108. The message may be a notification, a request for information, a warning, or a combination thereof. The message may be an audio message, a visual message, or a combination thereof. When the person 108 replies to the message, the STB device 102 may send the reply to the monitoring service 114 via the network interface 138 and the multimedia service provider 112.

When one or more alert conditions exist, the STB device 102 may receive a request from the monitoring service 114 to activate one or more of the video cameras 118. A video feed or feeds from the one or more video cameras 118 may be sent via the network interface 138 and the multimedia service provider 112 to the monitoring service 114. In a particular embodiment, the person 108 may have the option to block use of one or more of the video cameras 118. For example, the person 108 may have the option to block the use of one or more of the video cameras 118 before an alert condition is satisfied (e.g., the person may have the ability to inhibit the use of a video camera in the bedroom or the bathroom). As another example, the person 108 may have the option to block the use of one or more of the video cameras 118 when an alert condition is satisfied upon satisfactory response to a warning presented to the person 108 by the system 100. When the video feed or feeds are not blocked, the monitoring service 114 may provide the video feed or feeds to one or more third parties 116. In a particular embodiment, one or more of the third parties 116 may receive the video feed or feeds from the one or more video cameras 118 from the multimedia service provider 112.

When the person 108 blocks activation of at least one of the video cameras 118 and when one or more alert conditions are satisfied, the monitoring service 114 may provide an option to a legal guardian or family member of the person 108 to have another person (e.g., a police officer, a security guard, an emergency medical technician, or another person) to visit the residence 104. When the option is exercised, the monitoring service 114 may contact the chosen person and provide the chosen person with sufficient information to visit the residence 104.

The monitoring service 114 may include at least one processor 146, at least one memory 148 coupled to the at least one processor 146, and profiles 150 of one or more persons who are monitored using the system 100. The at least one processor 146 may execute instructions stored in the at least one memory 148 to analyze data received from the multimedia service provider 112. The data received from the multimedia service provider 112 may be data sent from STB devices (such as STB device 102) of each person being monitored by the system 100 (such as person 108). The data may include identification information, information regarding the location of the person 108 in the residence 104 where the person 108 is located, information regarding device usage in the residence 104, information from a biosensor coupled to the person 108, or combinations thereof. The identification information may enable the processor 146 to associate the data with a particular profile of the profiles 150.

The profiles 150 may include patterns pertaining to the people being monitored, such as the person 108. The patterns may be entered by the person 108 being monitored, may be entered by another person who is familiar with the person 108 being monitored, may be determined automatically based on gathered data, or any combination thereof. The patterns may describe a typical or normal pattern of behavior for a period of time such as a day, week, month or another time period. The patterns may be used to determine what is normal for the person, so that changes from the patterns can be identified by the monitoring service 114. The patterns may be periodically updated based on information provided from the STB devices 102.

The profiles 150 may include information that defines alert conditions. The alert conditions may be based on the location of the person 108, changes from normal patterns of the person 108, unusual movement or lack of movement of the person 108, usage of one or more devices 120-132 in the residence 104 for a period of time in the presence or absence of the person 108, non-use of one or more devices 120-132 within a period of time (e.g., the toilet or the shower), biological data received from a biosensor, the person 108 leaving the residence 104, other conditions or sensed data, or combinations thereof.

Some example alert conditions may include: the person 108 leaving the residence 104, the person 108 not moving when in a particular room (e.g., the shower) for longer than a threshold period of time (e.g., 5 minutes or longer), the person 108 leaving a particular device (e.g., a faucet, a cooking burner, a light, etc.) on and unattended for longer than a threshold period of time for the particular device, biological data from a biosensor being out of a normal or expected range, presence of the person 108 in a controlled location (e.g., the kitchen or a place where medication for the person 108 is kept) in the residence 104 for longer than a threshold time period for the location or at an unusual time of day, activity (e.g., movement) of the person 108 below a selected threshold or showing a marked increase or decline, and use of one of the devices 120-132 in the presence of the person 108 (e.g., a television or computer system) for a longer time than is normal or expected. Other types of alert conditions may be identified and monitored to provide for the safety and well being of the person 108, the residence 104, or both.

Information from other types of systems may be incorporated into the data received at the monitoring service 114. For example, the monitoring service 114 may receive information from an alarm system in the residence 104, from a smoke detection system in the residence 104, from a carbon monoxide detection system in the residence 104, from another safety or security sensor in the residence 104, or from combinations thereof.

The profiles 150 may include information about actions to be taken when one or more alert conditions are satisfied, such as which third party 116 or third parties 116 to contact. The monitoring service 114 may contact the third party 116 or third parties 116 by telephone, electronic message, or any other agreed on communication method. The action to be taken may be determined based on the particular alert condition that is satisfied. For example, the profile 150 for the person 108 may indicate that a warning is to be sent to the person 108 when a particular device is left on and unattended for longer than a first threshold time (e.g., 30 minutes). The profile 150 may further indicate that a particular third party is to be notified when the device is left on and unattended for longer than a second threshold time (e.g., 2 hours). When the second threshold time is reached, the monitoring service 114 may inform the particular third party. As another example, the monitoring service may contact a number of third parties, such as a relative of the person 108, an emergency medical service provider, and a medical contact for the person 108 when a biosensor that is a heart monitor indicates that the person 108 has an irregular heart beat or heart stoppage. For this situation and certain other situations, the monitoring service 114 may send notification to a third party 116 or third parties 116 without first attempting to communicate with the person 108.

The monitoring service 114 may determine which third party 116 or third parties 116 to notify based on the profile 150 of the person 108. For example, the profile 150 of the person 108 may specify notification of a relative, a legal guardian, a neighbor who looks after the person 108, another person, or combinations thereof when an alert condition occurs that does not indicate danger to the person 108 or the residence 104 (e.g., when the person 108 is using a particular device, such as a television, for longer than a normal usage time). The profile 150 may provide for notifying a police department, a fire department, an emergency medical service, or combinations thereof, when the alert condition indicates that the person is in danger (e.g., the person has not moved in a threshold period of time while taking a shower which may indicate unconsciousness of the person). In addition, when the system 100 includes a biosensor, the profile 150 may provide for notifying a health care provider associated with the person 108 when data from the biosensor indicates onset of a health condition.

Information sent to the monitoring service 114 from the STB device 102 may be encrypted to protect the privacy of the person 108. Also, information sent from the monitoring service 114 to the STB device 102 may be encrypted to protect the privacy of the person 108.

The profile 150 for the person 108 may indicate that certain third parties 116 are allowed to access video feeds provided from one or more video cameras 118 in the residence 104 when one or more alert conditions in the profile 150 for the person 108 are satisfied. When the one or more conditions are satisfied, the monitoring service 114 may provide a warning to the person 108 that one or more of the video cameras 118 are to be activated. The warning may include a prompt that enables the person 108 to block activation of the video cameras 118 so that the privacy of the person 108 is not unduly violated. The warning may be sent to a particular device in the residence 104 that is capable of presenting the warning to the person 108 and that is located near the person 108. In a particular embodiment, the warning to the person 108 is sent to a mobile communication device of the person 108 instead of, or in addition to, sending the warning to the particular device in the residence 104.

Figure 2:
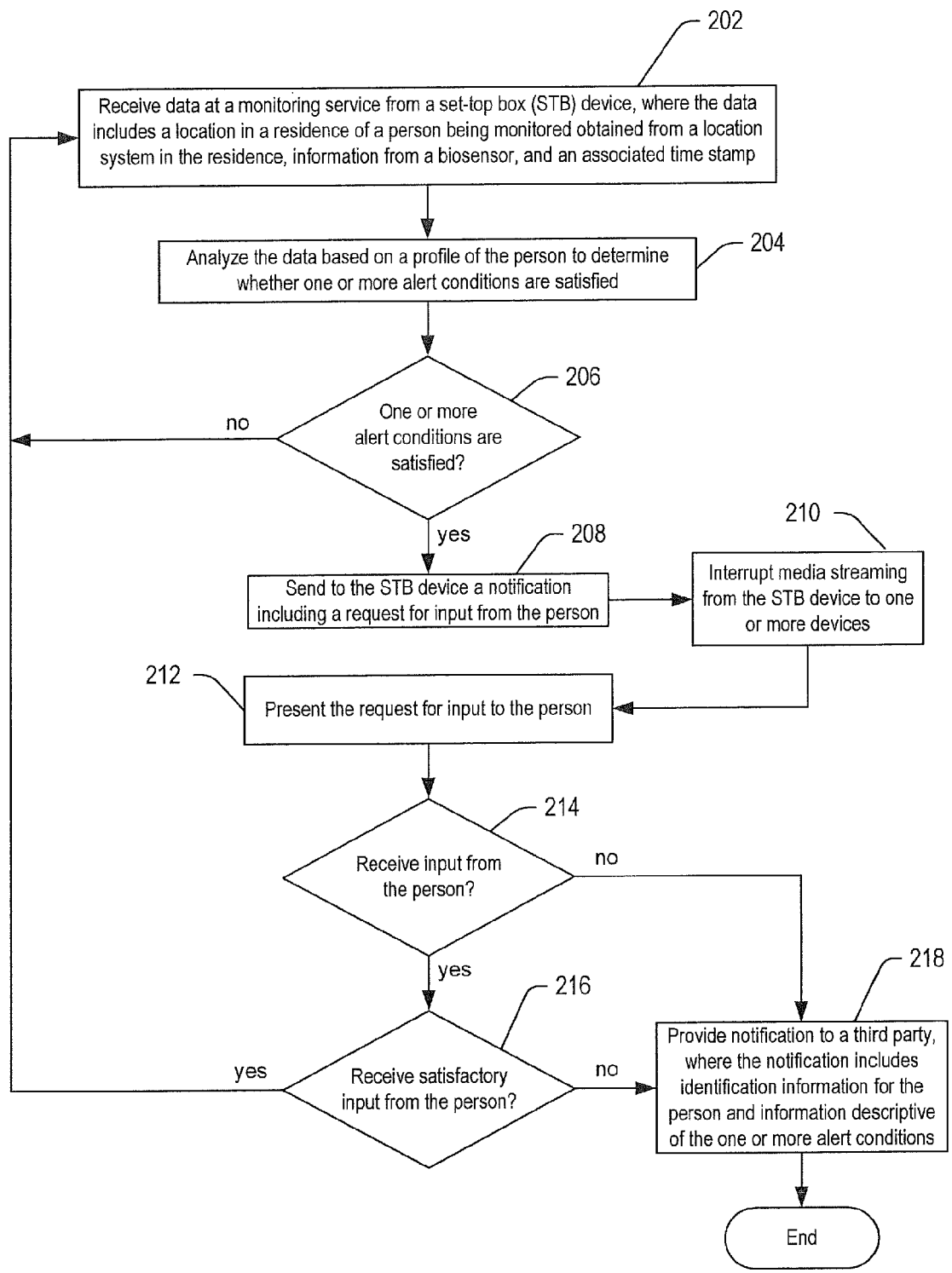
FIG. 2 is a flow diagram of a first particular embodiment of a method to monitor a person in a residence.

Referring to FIG. 2, a first particular embodiment of a method to monitor a person in a residence is illustrated. The method may include, at 202, receiving data at a monitoring service from a set-top box (STB) device. The data may include a location in the residence of the person being monitored obtained from a location system in the residence (e.g., the location may be obtained from the first component 106 and second components 110 of the location system depicted in FIG. 1). The data may also include an associated time stamp of the data and identification of the person being monitored.

The monitoring service may analyze the data based on a profile of the person to determine whether one or more alert conditions are satisfied, at 204. At 206, a check may be made to determine whether one or more alert conditions are satisfied. When no alert conditions are satisfied, the method may return to 202.

When one or more alert conditions are satisfied at 206, the monitoring service may send to the STB device a notification including a request for input from the person, at 208. The monitoring service may send the request for input to a mobile communication device associated with the person instead of, or in addition to, sending the request for input to the STB device. At 210, media streaming from the STB to one or more devices in the residence may be interrupted. For example, when the STB device is streaming television programming to a display device in the residence, the television programming may be interrupted to present the request for input. The request for input may be presented to the person via a device in the residence, at 212. The request for input may be an audio prompt, visual prompt, or both. The request for input may be sent from the STB device to one or more devices near the person that are capable of presenting the request for input to the person. For example, an audio prompt may be sent through a stereo system in the residence, speakers of a television in the residence, an intercom system, or speakers coupled to a computer system. A visual prompt may be displayed on a television or a monitor of a computer system.

A check may be made to determine whether input from the person has been received within a period of time, at 214. The period of time may be selected based on the profile, base on the alert condition, or both. For certain alert conditions, the period of time may be 15 seconds or longer. The input may be received at a device in the residence and sent to the STB device. In a particular embodiment, the input may be an oral response from the person. For example, the input may be spoken into an intercom system or the input may be spoken into a microphone of a remote control device associated with the STB device. Other systems for receiving an oral response may also be used. In other particular embodiments, the input may be entered through button manipulations, keystrokes, manipulation of another device, or other entry technique. For example, arrow buttons on a remote control device may be used to select an answer displayed on a television, or a keyboard, mouse, or both may be used to enter an answer to a prompt from the computer system.

In some embodiments, the input may include a code or other identification of the person in addition to an answer to the request for input. For example, a visual and audio request for input to the person who has a code of "163" may be "Are you OK?" A proper response to the request for input may be selection of "Yes" on a display device and entry of the code "163." The use of the code may emphasize that the person is responding specifically to the request for input.

When input is received, a check may determine whether input received from the person is satisfactory, at 216. Receipt of satisfactory input may indicate that there is no alert condition. For example, a satisfactory input to the prompt "Are you OK" is "Yes." An input of "No" or other input may be considered an unsatisfactory response. When the input from the person is satisfactory at 216, the method may return to 202.

When no input from the person is received at 214 within the period of time, or when unsatisfactory input from the person is received at 216, notification may be provided to one or more third parties at 218. The notification may include identification information for the person and information descriptive of the one or more alert conditions. The third party may be a relative of the person, a legal guardian of the person, a health care representative for the person, an emergency medical services provider, a parole officer, another third party, or combinations thereof. Which third party or third parties are notified may be based on the alert conditions that are satisfied and the profile of the person.

Figure 3:
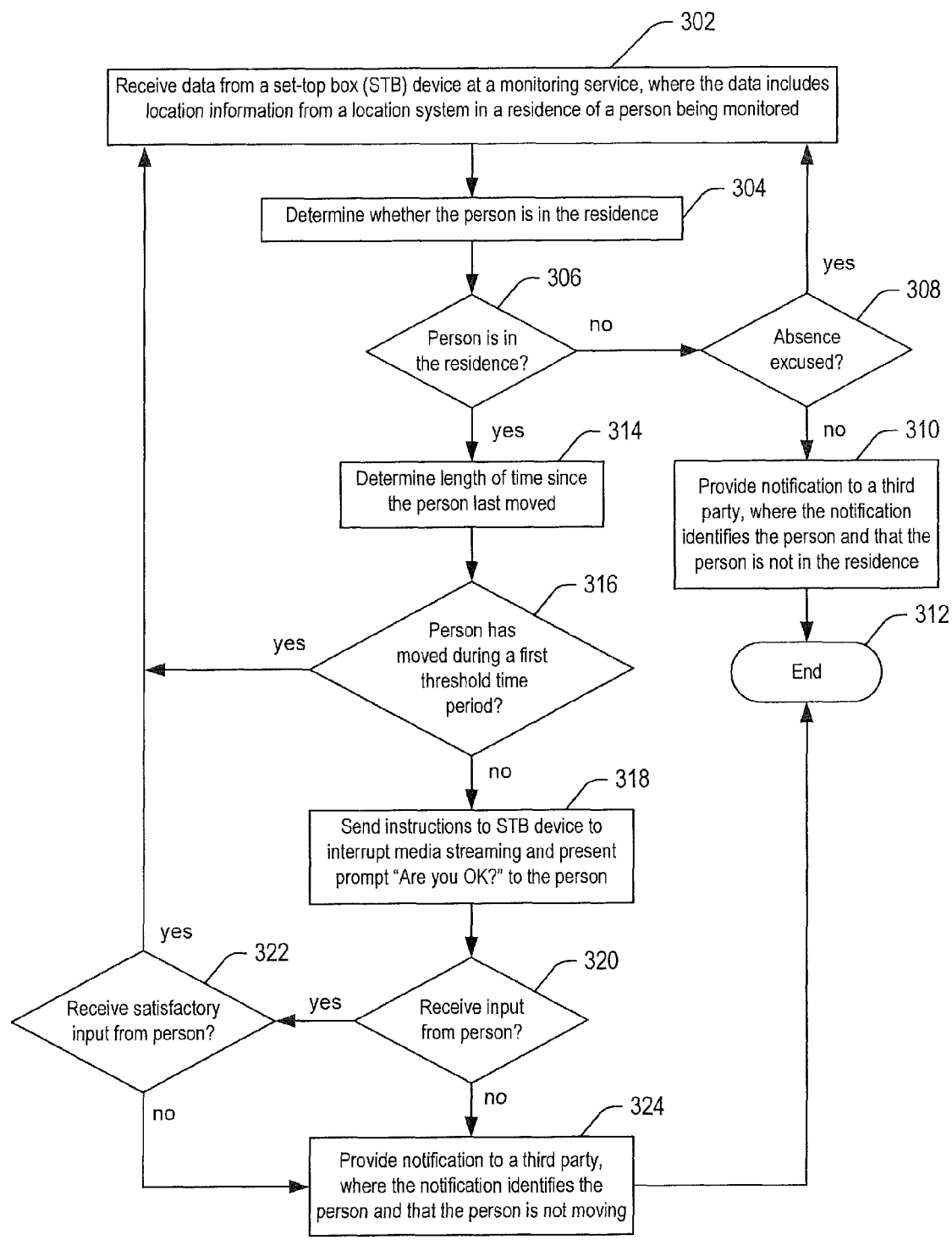
FIG. 3 is a flow diagram of a second particular embodiment of a method to monitor a person in a residence.

Referring to FIG. 3, a second particular embodiment of a method to monitor a person in a residence is illustrated. In some embodiments, the method may be used to ensure that the person remains in the residence, that when the person leaves the residence another person or people are notified, or both. For example, the method may be used to monitor a person subject to home confinement during certain periods of time. In another example, the method may be used to ensure that a person who may be subject to forgetfulness, mental lapses, or other medical conditions does not leave the residence without others knowing that the person is leaving. In some embodiments, movement of the person may be monitored. Movement of the person may indicate that the person is in the residence and that the person is physically okay. In some embodiments, the person may be required to periodically enter input via a specific device in the residence (e.g., a computer system or a landline telephone) that provides evidence that the person is in the residence. The method may be performed by the system 100 depicted in FIG. 1.

The method may include, at 302, receiving data from a set-top box (STB) device at a monitoring service. The data may include location information from a location system in the residence of the person being monitored and identification of the person. The monitoring service may determine whether the person is in the residence, at 304.

A decision may be made based on whether the person is in the residence, at 306. When the person has left the residence at 306, a decision may determine whether the absence is excused, at 308. The absence may be excused when the absence is a regularly scheduled absence or a known special event. A regularly scheduled absence may be, but is not limited to, absence for a job, a regularly scheduled social engagement, a regularly scheduled time to do chores away from the residence (e.g., shopping), or combinations thereof. A known special event may be, but is not limited to, an appointment, an entertainment excursion, dining out, or combinations thereof. When the absence is excused, the method may return to 302.

When the absence is not excused at 308, the method may include providing notification to at least one third party, at 310. The notification may identify the person, may state that the person is not at the residence, and may provide the last time when the person was in the residence. The method may then end, at 312.

When the decision at 306 is that the person is in the residence, a length of time since the person last moved may be determined at 314. At 316, a determination may be made whether the person has moved within a threshold time period. Values for the threshold time period may be part of a profile for the person available to the monitoring service. The threshold time period may be based on the type of location system used (e.g., whether the location system tracks movement into or out of rooms in the residence or monitors location within a room), the room in the residence where the person is located, the time of day, or combinations thereof. When the person has moved within the threshold time period, the method may return to 302.

When the person has not moved within the threshold period of time at 316, the monitoring service may send instructions to the STB device to interrupt media streaming to a device in the residence and to present a prompt to the person, at 318. The prompt may be presented to a device located near the person. The prompt may be an audio prompt, a visual prompt, or both. In an embodiment, the prompt is "Are you OK?" In an embodiment, the prompt is sent to a mobile communication device associated with the person in addition to, or instead of, sending the request to a device in the residence located near the person.

A check may be made to determine whether input from the person has been received within a period of time at 320. The period of time may be selected based on the profile, base on the alert condition, or both. For certain alert conditions, the period of time may be 15 seconds or longer. When input from the person is received, the input may be forwarded via the STB device to the monitoring service. The input may be an oral response from the person. For example, the input may be spoken into an intercom system or the input may be spoken into a microphone in a remote control device for the STB device. Other systems for receiving an oral response may also be used. The input may be entered through button manipulations, keystrokes, peripheral device manipulation or other entry technique. For example, arrow buttons on a remote control device may be used to select an answer displayed on a television, or a keyboard, mouse, or both may be used to enter an answer to a prompt on a computer system. In some embodiments, the input may need to include a code or other identification of the person in addition to an answer to the prompt.

When input is received, a check may determine whether the input from the person is satisfactory at 322. Satisfactory input may indicate that there is no alert condition and that the person is in the residence. When the input from the person is satisfactory, the method may return to 302.

When no input from the person is received at 320 within the period of time, or when unsatisfactory input from the person is received at 322, notification may be provided to one or more third parties, at 324. The notification may identify the person and inform each third party that the person has not moved for at least the first threshold period of time. The method may then end, at 312.

Figure 4:
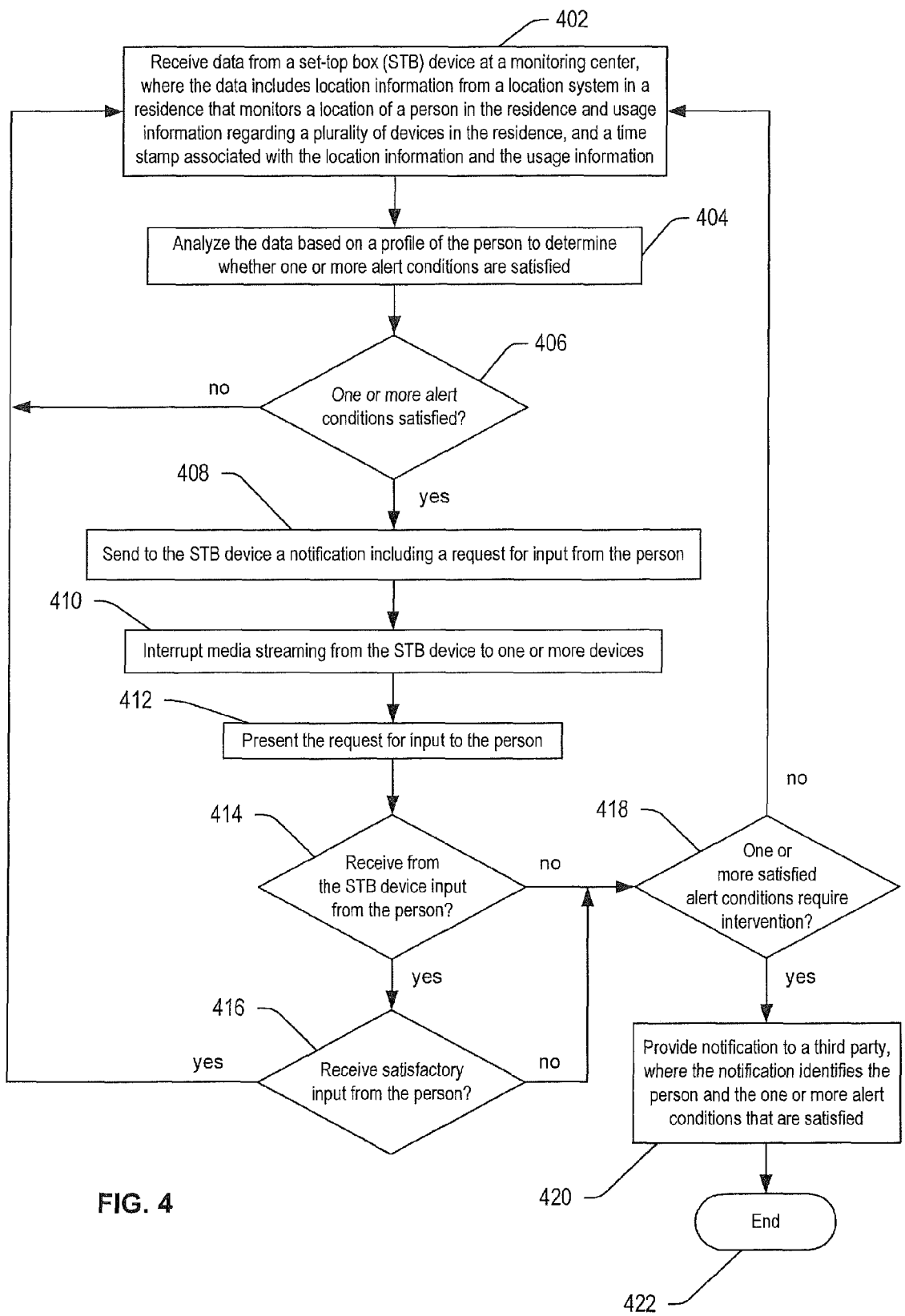
FIG. 4 is a flow diagram of a third particular embodiment of a method to monitor a person in a residence.

Referring to FIG. 4, a third particular embodiment of a method to monitor a person in a residence is illustrated. The method may include, at 402, receiving data at a monitoring service from a STB device. The data may include location information indicating a location in the residence of the person being monitored that is obtained from a location system in the residence. The data may include usage information regarding a plurality of devices in the residence. The data may also include an identifier of the person and associated time stamps of the data associated with the location information and the usage information. The method may be performed by the system 100 depicted in FIG. 1.

The monitoring service may analyze the data based on a profile of the person to determine whether one or more alert conditions are satisfied at 404. At 406, a check may be made to determine whether one or more alert conditions are satisfied. When no alert conditions are satisfied, the method may return to 402.

When one or more alert conditions are satisfied at 406, the monitoring service may send to the STB device a notification including a request for input from the person, at 408. At 410, media streaming from the STB to one or more devices in the residence may be interrupted. The request for input may be presented to the person, at 412. The request for input may be an audio prompt, visual prompt, or both. The request for input may be sent from the STB device to one or more devices near the person that are capable of presenting the request for input to the person.

A check may be made at 414 to determine whether input from the person has been received within a period of time. The input may be received at a device in the residence and sent to the STB device. The input may be an oral response from the person or a response entered through button manipulations, keystrokes, peripheral device manipulation or other entry techniques.

In some embodiments, the input may need to include a code or other identification of the person in addition to an answer to the request for input. The code may be a word or number presented in the request for input that the person has to enter when answering the request for input. The use of the code may emphasize that the person is responding specifically to request for input.

When input is received, a check at 416 may determine whether input from the person is satisfactory. When the input from the person is satisfactory, the method may return to 402.

When no input from the person is received at 414 within the period of time, or when unsatisfactory input from the person is received at 416, the method may include at 418 determining whether the one or more satisfied alert conditions require intervention. Alert conditions that may require intervention include, but are not limited to, lack of motion of the person for longer than a first time threshold, one or more devices that are not located near to the location of the person being left on for more than a second threshold time (e.g., a gas burner that is on in a kitchen for more than an hour when the person has not been near the control for the gas burner during the hour), one or more devices are in use by the person for longer than a third threshold time period (e.g., the person is using a game system without interruption for more than three hours), an unauthorized or unexpected leaving of the residence by the person, conditions that indicate that the person or the residence may be in danger, or combinations thereof. Alert conditions that may not require intervention may include reminders to the person that do not pose a significant risk of danger to the person or to the residence. For example, some alert conditions that may not require intervention include, but are not limited to, an alert that a clothes dryer has turned off, one or more devices being on for longer than a first threshold of time but less than a second threshold of time when the person is not in the vicinity of the one or more devices (e.g., water in the bathtub is running for more than 5 minutes but less than 30 minutes without the person being located close to the bathtub), and the person using a device for longer than a first threshold period of time but less than a second threshold period of time (e.g., the person using a piece of exercise equipment for longer than 30 minutes, but less than an hour).

When the one or more satisfied alert conditions do not require intervention at 418, the method may return to 402. When the one or more satisfied alert conditions do require intervention at 418, notification may be provided to at least one third party, at 420. The notification may identify the person and the one or more satisfied alert conditions. The method may end at 422.

Figure 5:
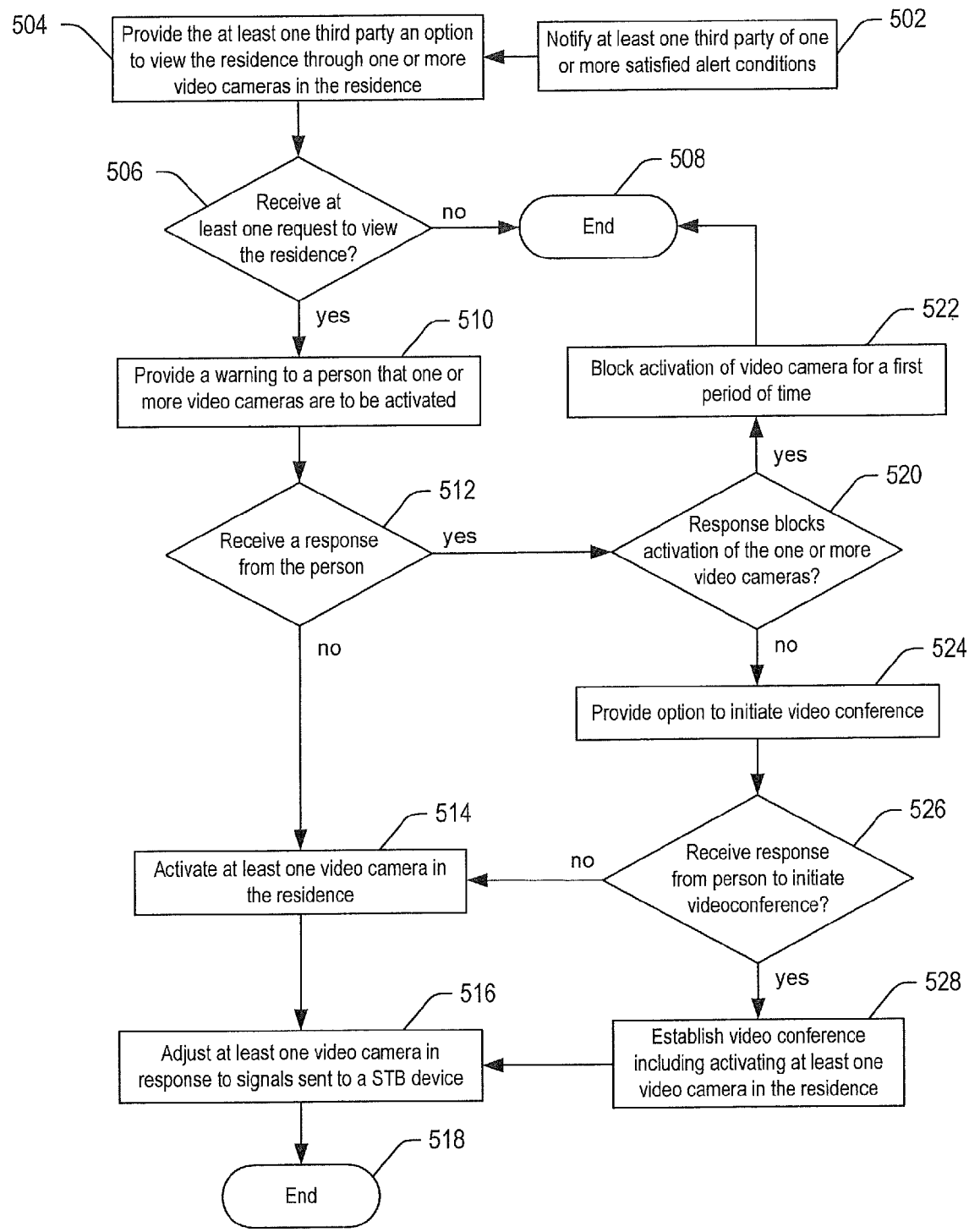
FIG. 5 is a flow diagram of a fourth particular embodiment of a method to monitor a person in a residence.

Referring to FIG. 5, a fourth particular embodiment of a method to monitor a person in a residence is illustrated. The method provides at least one third party with the ability to view a video stream of the residence from one or more video cameras in the residence when one or more alert conditions regarding the person, the residence, or both are satisfied. The person may be given an opportunity to block sending of a video stream or an opportunity to establish a video conference with one or more of the third parties. Providing the person with the ability to block the video stream showing the residence may maintain privacy of the person and preserve the dignity of the person in certain situations. Providing the person with the ability to establish a video conference with one or more of the third parties may calm the person in the event of an alert condition by allowing the person to interact with other people instead of answering questions presented on a screen or presented without a corresponding image of the person asking the questions. The method may be performed by the system 100 depicted in FIG. 1.

At least one third party may be notified of one or more satisfied alert conditions related to the person being monitored at 502. The notification may be provided by a monitoring service through any agreed on communication method. The at least one third party may be provided with an option to view the residence through one or more video cameras in the residence at 504. The at least one third party may be a relative, legal guardian, medical personnel associated with the person, emergency service providers, a parole officer, another person, or combinations thereof.

A check may be made to determine whether at least one third party requests to view the residence at 506. When no request to view the residence is received, the method ends at 508. When at least one request to view the residence is received, a warning may be provided to the person being monitored in the residence at 510. The warning may indicate that one or more video cameras are about to be activated. The warning may be sent to a set-top box (STB) device from the monitoring service. The STB device may interrupt a program being streamed via the STB device to a display device or another device in the residence. The STB device may send the warning to a device close to the person that is capable of presenting the warning to the person (e.g., a television, a computer system, an intercom, etc.). The warning may be sent to a mobile telecommunication device associated with the person. The warning may be a visual warning, an audio warning, or a combination thereof. The warning may include an option to block activation of one or more video cameras in the residence. In a particular embodiment, the warning includes a list of who is to receive a video stream when the one or more video cameras are activated. The person may be able to block some or all of the third parties presented in the list from receiving the video stream.

The STB device may determine whether a response is received from the person at 512. When no response is received from the person, at least one video camera in the residence is activated at 514. A video feed or feeds from the at least one video camera are sent to through the STB device to the monitoring service. The at least one video camera may include a video camera that is located closest to the person. The monitoring service may provide the video feed or feeds to the one or more third parties that requested to view the residence.

In response to signals sent to the STB device, the one or more video cameras may be adjusted, at 516. For example, adjusting may include activating a different video camera, changing a viewing angle, changing the focus, etc. When a video camera includes controls that allow for adjustment of the video camera, the monitoring service may provide one or more of the third parties who elected to view the residence with the option to remotely adjust the video camera. The monitoring service may receive a command from a third party to adjust the video camera. The monitoring service may forward the command to the STB device. The STB device may send signals to the video camera to adjust the video camera. The method may end at 518.

When a response from the person is received at 512, a check may determine whether the response blocks activation of the one or more video cameras at 520. When the response at 520 blocks activation of the one or more video cameras, activation of the one or more video cameras may be blocked for a first period of time, at 522. The first period of time may be selected based on the profile, base on the alert condition, or both. For certain alert conditions, the first period of time may be at least 1 minute, at least 5 minutes, or at least 10 minutes. After expiration of the period of time, another warning that the cameras are to be activated may be presented to the person when the one or more satisfied alert conditions remain satisfied. The method may end at 508.

When the person blocks activation of the video cameras, the monitoring service may provide an option to a legal guardian or family member of the person to have a person (e.g., a police officer, a security guard, an emergency medical technician, or another person) visit the residence. When the option is exercised, the monitoring service may contact the chosen person and provide the chosen person with sufficient information to visit the residence.

When the response at 520 does not block activation of the one or more video cameras, an option may be presented to the person to initiate a videoconference, at 524. A determination may be made whether the person elects to establish the video conference at 526. When the person elects to establish the videoconference, at least one video camera in the residence may be activated and the videoconference may be established at 528. In a particular embodiment, the person may choose which third parties participate in the videoconference. The person may also be able to choose whether any third party who will not participate in the videoconference is able to view the residence through the one or more video cameras, or whether access to a video feed or feeds from the one or more video cameras is blocked. One or more of the third parties may be able to adjust at least one of the video cameras by signals forwarded through the STB device at 516. The method may end at 518.

When a response from the person indicates that the person does not want to establish a videoconference at 526, or when no response from the person is received at 526 within a time period for response, the method may proceed to 514 where at least one video camera in the residence is activated. The STB device may send signals to at least one video camera to adjust the at least one video camera at 516. The signals may be based on at least one command sent by a third party viewing the residence. The signals to adjust the at least one video camera may be sent to the monitoring service from a third party and forwarded to the STB device. The method may end at 518.

Figure 6:
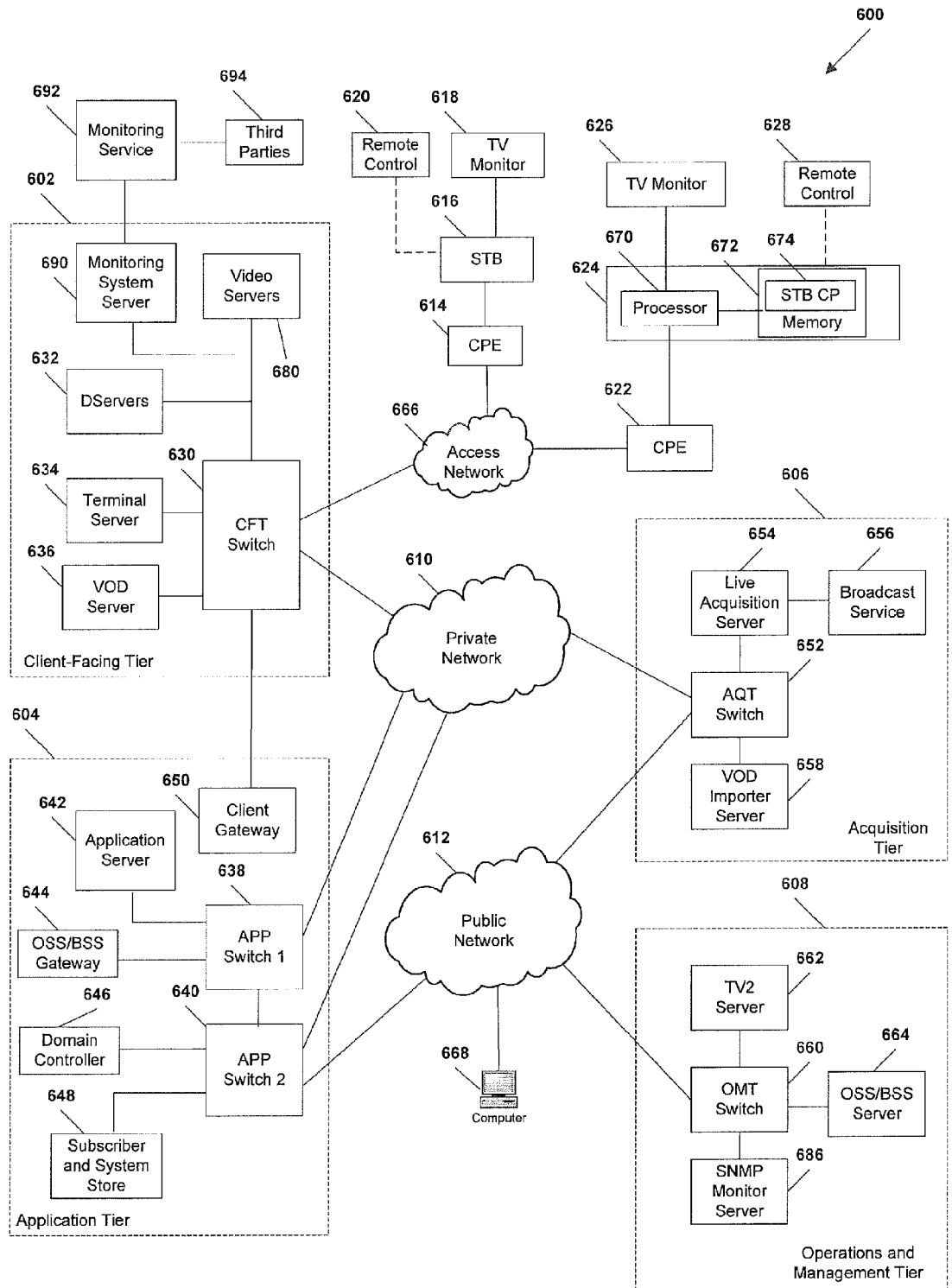
FIG. 6 is a block diagram of an illustrative embodiment of an Internet Protocol Television system configured to perform monitoring operations and to support a monitoring service.

Referring to FIG. 6, an illustrative embodiment of an Internet Protocol Television (IPTV) system that may be used to provide monitoring service and to share private content is illustrated and is generally designated 600. As shown, the system 600 can include a client facing tier 602, an application tier 604, an acquisition tier 606, and an operations and management tier 608. Each tier 602, 604, 606, 608 is coupled to a private network 610; to a public network 612, such as the Internet; or to both the private network 610 and the public network 612. For example, the client-facing tier 602 can be coupled to the private network 610. Further, the application tier 604 can be coupled to the private network 610 and to the public network 612. The acquisition tier 606 can also be coupled to the private network 610 and to the public network 612. Additionally, the operations and management tier 608 can be coupled to the public network 612.

As illustrated in FIG. 6, the various tiers 602, 604, 606, 608 communicate with each other via the private network 610 and the public network 612. For instance, the client-facing tier 602 can communicate with the application tier 604 and the acquisition tier 606 via the private network 610. The application tier 604 can communicate with the acquisition tier 606 via the private network 610. Further, the application tier 604 can communicate with the acquisition tier 606 and the operations and management tier 608 via the public network 612. Moreover, the acquisition tier 606 can communicate with the operations and management tier 608 via the public network 612. In a particular embodiment, elements of the application tier 604, including, but not limited to, a client gateway 650, can communicate directly with the client-facing tier 602.

The client-facing tier 602 can communicate with user equipment via an access network 666, such as an Internet Protocol Television (IPTV) access network. In an illustrative embodiment, customer premises equipment (CPE) 614, 622 can be coupled to a local switch, router, or other device of the access network 666. The client-facing tier 602 can communicate with a first representative set-top box device 616 at a first customer premise via the first CPE 614 and with a second representative set-top box device 624 at a second customer premise via the second CPE 622. The CPE 614, 622 can include routers, local area network devices, modems, such as digital subscriber line (DSL) modems, any other suitable devices for facilitating communication between a set-top box device and the access network 666, or any combination thereof.

In a particular embodiment, the client-facing tier 602 can be coupled to the CPE 614, 622 via fiber optic cables. Alternatively, the CPE 614, 622 can be digital subscriber line (DSL) modems that are coupled to one or more network nodes via twisted pairs, and the client-facing tier 602 can be coupled to the network nodes via fiber-optic cables. Each set-top box device 616, 624 can process data received via the access network 666, via an IPTV software platform.

The first set-top box device 616 can be coupled to a first external display device, such as a first television monitor 618, and the second set-top box device 624 can be coupled to a second external display device, such as a second television monitor 626. Moreover, the first set-top box device 616 can communicate with a first remote control 620, and the second set-top box device 624 can communicate with a second remote control 628. The set-top box devices 616, 624 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 616, 624 can receive data, video, or any combination thereof, from the client-facing tier 602 via the access network 666 and render or display the data, video, or any combination thereof, at the television monitor 618, 626 to which it is coupled. In an illustrative embodiment, the set-top box devices 616, 624 can include tuners that receive and decode television programming signals or packet streams for transmission to the television monitors 618, 626. Further, the set-top box devices 616, 624 can include a STB processor 670 and a STB memory device 672 that is accessible to the STB processor 670. In one embodiment, a computer program, such as the STB computer program 674, can be embedded within the STB memory device 672. In another illustrative embodiment, a user computing device 684, such as a personal computer, laptop or local server, can be coupled to a set-top box device, such as the second representative set-top box device 624, for example, via a universal serial bus (USB) connection or other connection.

In an illustrative embodiment, the client-facing tier 602 can include a client-facing tier (CFT) switch 630 that manages communication between the client-facing tier 602 and the access network 666 and between the client-facing tier 602 and the private network 610. As illustrated, the CFT switch 630 is coupled to one or more data servers, such as D-servers 632, that store, format, encode, replicate, or otherwise manipulate or prepare video content for communication from the client-facing tier 602 to the set-top box devices 616, 624. The CFT switch 630 can also be coupled to a terminal server 634 that provides terminal devices with a connection point to the private network 610. In a particular embodiment, the CFT switch 630 can be coupled to a video-on-demand (VOD) server 636 that stores or provides VOD content imported by the IPTV system 600.

Further, the CFT switch 630 is coupled to one or more video servers 680 that receive video content and transmit the content to the set-top boxes 616, 624 via the access network 666. In a particular embodiment, the CFT switch 630 can be coupled to one or more publication servers that facilitate the formation of groups that share private content and the inclusion of indicators of such private content with video content received by users in a group.

The CFT switch 630 may be coupled to a monitoring system server 690. The monitoring system server 690 may receive data from location systems located in residences with set-top boxes. The data received from a particular set-top box may pertain to the location of a person in a residence. The data may include data regarding device usage in residences with people being monitored. The data may also include data from one or more biosensors coupled to the people being monitored. The monitoring system server 690 may provide the data to a monitoring service 692. The monitoring service 692 may analyze the data to determine whether one or more alert conditions relating to the person, the residence, or both are satisfied. When one or more alert conditions relating to the person, the residence, or both are satisfied, the monitoring service 692 may alert one or more third parties 694 about the one or more satisfied alert conditions. The alert to the third parties may be sent electronic mail, by phone, or by any other communication method.

In an illustrative embodiment, the client-facing tier 602 can communicate with a large number of set-top boxes, such as the representative set-top box devices 616, 624 over a wide geographic area, such as a regional area, a metropolitan area, a viewing area, a designated market area or any other suitable geographic area, market area, or subscriber or customer group that can be supported by networking the client-facing tier 602 to numerous set-top box devices. In a particular embodiment, the CFT switch 630, or any portion thereof, can include a multicast router or switch that feeds one or more video streams from a video server to multiple set-top box devices.

As illustrated in FIG. 6, the application tier 604 can communicate with both the private network 610 and the public network 612. The application tier 604 can include a first application tier (APP) switch 638 and a second APP switch 640. In a particular embodiment, the first APP switch 638 can be coupled to the second APP switch 640. The first APP switch 638 can be coupled to an application server 642 and to an OSS/BSS gateway 644. In a particular embodiment, the application server 642 can provide applications to the set-top box devices 616, 624 via the access network 666, which enable the set-top box devices 616, 624 to provide functions, such as display, messaging, processing of IPTV data and VOD material, etc. In a particular embodiment, the OSS/BSS gateway 644 includes operation systems and support (OSS) data, as well as billing systems and support (BSS) data. In one embodiment, the OSS/BSS gateway 644 can provide or restrict access to an OSS/BSS server 664 that stores operations and billing systems data.

The second APP switch 640 can be coupled to a domain controller 646 that provides Internet access, for example, to users at their computers 668 via the public network 612. For example, the domain controller 646 can provide remote Internet access to IPTV account information, e-mail, personalized Internet services, or other online services via the public network 612. In addition, the second APP switch 640 can be coupled to a subscriber and system store 648 that includes account information, such as account information that is associated with users who access the IPTV system 600 via the private network 610 or the public network 612. In an illustrative embodiment, the subscriber and system store 648 can store subscriber or customer data and create subscriber or customer profiles that are associated with IP addresses of corresponding set-top box devices 616, 624.

In a particular embodiment, the application tier 604 can include a client gateway 650 that communicates data directly to the client-facing tier 602. In this embodiment, the client gateway 650 can be coupled directly to the CFT switch 630. The client gateway 650 can provide user access to the private network 610 and the tiers coupled thereto. In an illustrative embodiment, the set-top box devices 616, 624 can access the IPTV system 600 via the access network 666, using information received from the client gateway 650. User devices can access the client gateway 650 via the access network 666, and the client gateway 650 can allow such devices to access the private network 610 once the devices are authenticated or verified. Similarly, the client gateway 650 can prevent unauthorized devices, such as hacker computers or stolen set-top box devices from accessing the private network 610, by denying access to these devices beyond the access network 666.

For example, when the first representative set-top box device 616 accesses the client-facing tier 602 via the access network 666, the client gateway 650 can verify subscriber information by communicating with the subscriber and system store 648 via the private network 610. Further, the client gateway 650 can verify billing information and status by communicating with the OSS/BSS gateway 644 via the private network 610. In one embodiment, the OSS/BSS gateway 644 can transmit a query via the public network 612 to the OSS/BSS server 664. After the client gateway 650 confirms subscriber and/or billing information, the client gateway 650 can allow the set-top box device 616 to access IPTV content and VOD content at the client-facing tier 602. If the client gateway 650 cannot verify subscriber information for the set-top box device 616, e.g., because it is connected to an unauthorized twisted pair, the client gateway 650 can block transmissions to and from the set-top box device 616 beyond the access network 666.

As indicated in FIG. 6, the acquisition tier 606 includes an acquisition tier (AQT) switch 652 that communicates with the private network 610. The AQT switch 652 can also communicate with the operations and management tier 608 via the public network 612. In a particular embodiment, the AQT switch 652 can be coupled to a live acquisition server 654 that receives or acquires television content, movie content, advertisement content, other video content, or any combination thereof, from a broadcast service 656, such as a satellite acquisition system or satellite head-end office. In a particular embodiment, the live acquisition server 654 can transmit content to the AQT switch 652, and the AQT switch 652 can transmit the content to the CFT switch 630 via the private network 610.

In an illustrative embodiment, content can be transmitted to the D-servers 632, where it can be encoded, formatted, stored, replicated, or otherwise manipulated and prepared for communication from the video server(s) 680 to the set-top box devices 616, 624. The CFT switch 630 can receive content from the video server(s) 680 and communicate the content to the CPE 614, 622 via the access network 666. The set-top box devices 616, 624 can receive the content via the CPE 614, 622, and can transmit the content to the television monitors 618, 626. In an illustrative embodiment, video or audio portions of the content can be streamed to the set-top box devices 616, 624.

Further, the AQT switch 652 can be coupled to a video-on-demand importer server 658 that receives and stores television or movie content received at the acquisition tier 606 and communicates the stored content to the VOD server 636 at the client-facing tier 602 via the private network 610. Additionally, at the acquisition tier 606, the video-on-demand (VOD) importer server 658 can receive content from one or more VOD sources outside the IPTV system 600, such as movie studios and programmers of non-live content. The VOD importer server 658 can transmit the VOD content to the AQT switch 652, and the AQT switch 652, in turn, can communicate the material to the CFT switch 630 via the private network 610. The VOD content can be stored at one or more servers, such as the VOD server 636.

When users issue requests for VOD content via the set-top box devices 616, 624, the requests can be transmitted over the access network 666 to the VOD server 636, via the CFT switch 630. Upon receiving such requests, the VOD server 636 can retrieve the requested VOD content and transmit the content to the set-top box devices 616, 624 across the access network 666, via the CFT switch 630. The set-top box devices 616, 624 can transmit the VOD content to the television monitors 618, 626. In an illustrative embodiment, video or audio portions of VOD content can be streamed to the set-top box devices 616, 624.

FIG. 6 further illustrates that the operations and management tier 608 can include an operations and management tier (OMT) switch 660 that conducts communication between the operations and management tier 608 and the public network 612. In the embodiment illustrated by FIG. 6, the OMT switch 660 is coupled to a TV2 server 662. Additionally, the OMT switch 660 can be coupled to an OSS/BSS server 664 and to a simple network management protocol (SNMP) monitor 686 that monitors network devices within or coupled to the IPTV system 600. In a particular embodiment, the OMT switch 660 can communicate with the AQT switch 652 via the public network 612.

In an illustrative embodiment, the live acquisition server 654 can transmit content to the AQT switch 652, and the AQT switch 652, in turn, can transmit the content to the OMT switch 660 via the public network 612. In this embodiment, the OMT switch 660 can transmit the content to the TV2 server 662 for display to users accessing the user interface at the TV2 server 662. For example, a user can access the TV2 server 662 using a personal computer (PC) 668 coupled to the public network 612.

Embodiments disclosed herein enable monitoring of individuals in their houses or residences to detect emergency situations, deteriorating health, and so forth. Notifications can be automatically generated in response to movements of the person being monitored. Threshold levels associated with the person being monitored can be used to determine who is to be notified when an alert condition is satisfied (e.g., the person being monitored, a guardian of the person being monitored, a health care professional, etc.), activation of additional monitoring devices such as video cameras, and so forth. In a particular embodiment where the monitoring system utilizes an IPTV system, the IPTV system facilitates communication of monitored information to a monitoring service and facilitates communication with the person being monitored (e.g., by interrupting media being streamed to the person being monitored and presenting messages to the person being monitored using devices located near the person that are coupled to the IPTV system).

Figure 7:
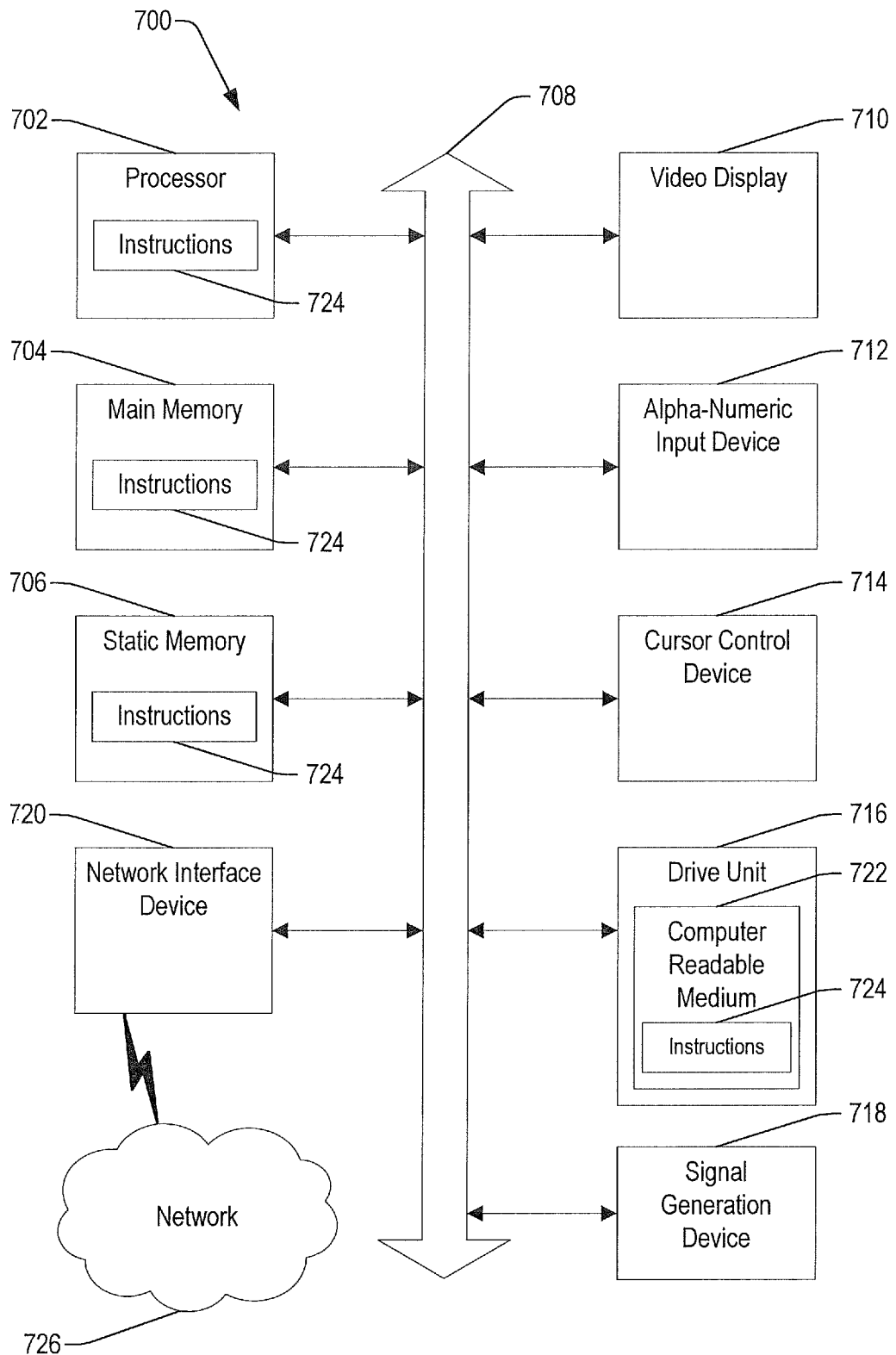
FIG. 7 is a block diagram of an illustrative embodiment of a general computer system.

Referring to FIG. 7, an illustrative embodiment of a general computer system is shown and is designated 700. The computer system 700 may include a set of instructions that can be executed to cause the computer system 700 to perform any one or more of the methods or computer based functions disclosed herein. The computer system 700 may operate as a standalone device or may be connected, e.g., using a network, to other computer systems or peripheral devices. For example, the computer system 700 may include or be included within any one or more of the STB device 102, the first component 106 and the second components 110 of the location system, the multimedia service provider 112, the monitoring service 114, the display device 120, the remote control device 122, and the plurality of devices 124-132 described with reference to FIG. 1.

In a networked deployment, the computer system 700 may operate in the capacity of a server or as a client user computer in a server-client user network environment, or as a peer computer system in a peer-to-peer (or distributed) network environment. The computer system 700 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a web appliance, or any other machine capable of executing a set of instructions (sequential or otherwise) that specify actions to be taken by that machine. In a particular embodiment, the computer system 700 may be implemented using electronic devices that provide video, audio, or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 may include a main memory 704 and a static memory 706, which can communicate with each other via a bus 708. As shown, the computer system 700 may further include a video display unit 710, such as a liquid crystal display (LCD), a projection television system, a flat panel display, or a solid state display. Additionally, the computer system 700 may include an input device 712, such as a keyboard, and a cursor control device 714, such as a mouse. The computer system 700 may also include a disk drive unit 716, a signal generation device 718, such as a speaker or remote control, and a network interface device 720. Some computer systems 700 may not include an input device (e.g., a server may not include an input device).

In a particular embodiment, as depicted in FIG. 7, the disk drive unit 716 may include a computer-readable storage medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable storage media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by the computer system 700. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable storage medium that stores instructions 724 or receives, stores and executes instructions 724 responsive to a propagated signal, so that a device connected to a network 726 may communicate voice, video or data over the network 726. Further, the instructions 724 may be transmitted or received over the network 726 via the network interface device 720.

While the computer-readable storage medium is shown to be a single medium, the term "computer-readable storage medium" includes a single medium or multiple media, such as a centralized or distributed database, and/or associated caches and servers that store one or more sets of instructions. The term "computer-readable storage medium" shall also include any medium that is capable of storing or encoding a set of instructions for execution by a processor or that cause a computer system to perform any one or more of the methods or operations disclosed herein.

In a particular non-limiting, exemplary embodiment, the computer-readable storage medium may include a solid-state memory such as a memory card or other package that houses one or more non-volatile read-only memories. Further, the computer-readable storage medium may be a random access memory or other volatile re-writable memory. Additionally, the computer-readable storage medium may include a magneto-optical or optical medium, such as a disk or tapes or other storage device. A digital file attachment to an e-mail or other self-contained information archive or set of archives may be considered equivalent to a tangible storage medium. Accordingly, the disclosure is considered to include any one or more of a computer-readable storage medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP, IEEE 802.x) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
a processor; and
a memory accessible to the processor, the memory including instructions that, when executed by the processor, cause the processor to perform operations including:
determining whether an alert condition is satisfied based on data received from a set-top box device; and
sending, to the set-top box device, an activation request upon determining that the alert condition is satisfied, wherein the activation request enables the set-top box device to initiate a prompt, and wherein activation of a video camera coupled to the set-top box device is based on a response to the prompt.

2. The system of claim 1, wherein the prompt is presented at an output device coupled to the set-top box device.

3. The system of claim 1, wherein the memory further comprises a profile associated with the set-top box device, and wherein the operations further include determining whether the alert condition is satisfied based on the profile.

4. The system of claim 1, wherein the data received from the set-top box device includes location information indicating a location of a monitoring device and a time stamp associated with the location information.

5. The system of claim 4, wherein the data received from the set-top box device includes a time stamp associated with the location information.

6. The system of claim 1, wherein the data received from the set-top box device includes biological information, the biological information associated with a biosensor coupled to an entity being monitored by a monitoring device.

7. The system of claim 1, wherein the operations further include:
determining whether the response is associated with an unsatisfactory input received via the set-top box device; and
sending a first notification to a third party based on determining that the response is associated with the unsatisfactory input.

8. The system of claim 1, wherein the operations further include:
determining whether the response was received via the set-top box device during a response time period; and
sending a second notification to a third party based on determining that the response was not received during the response time period.

9. A method comprising:
receiving, at a set-top box device, an activation request from a monitoring service, the activation request associated with activation of a video camera coupled to the set-top box device, wherein the activation request is received based on determining that an alert condition is satisfied; and
activating the video camera based on a response to a prompt, wherein the prompt is presented by the set-top box device in response to receiving the activation request.

10. The method of claim 9, further comprising presenting the prompt at an output device coupled to the set-top box device.

11. The method of claim 9, further comprising:
determining whether the response includes a correct code; and
blocking activation of the video camera based on determining that the response includes the correct code.

12. The method of claim 9, further comprising:
receiving an input from a location system associated with the set-top box device, wherein the location system is operable to identify a location of a monitoring device; and
prior to receiving the activation request, sending location data based on the input to the monitoring service.

13. The method of claim 9, wherein a location system associated with the set-top box device comprises a radio frequency identification emitter configured to be coupled to an entity to be monitored.

14. The method of claim 13, wherein the location system includes a plurality of radio frequency identification detectors associated with the set-top box device.

15. The method of claim 9, further comprising:
receiving a first input from a location system associated with the set-top box device, wherein the first input identifies a first location of a monitoring device at a first time;
receiving a second input from the location system, wherein the second input identifies a second location of the monitoring device at a second time, the second time subsequent to the first time; and
sending first data to the monitoring service, wherein the first data is based on the first input and the second input.

16. The method of claim 15, further comprising:
determining whether the first location matches the second location based on the first input and the second input; and
sending second data to the monitoring service, wherein the second data includes an indication of whether the first location matches the second location.

17. A computer-readable storage device storing instructions, the instructions executable by a processor to cause the processor to perform operations comprising:
determining whether alert conditions are satisfied based on data received from a set-top box device; and
sending, to the set-top box device, an activation request based on determining that the alert conditions are satisfied, wherein the activation request enables the set-top box device to initiate a prompt, and wherein activation of a video camera coupled to the set-top box device is based on a response to the prompt.

18. The computer-readable storage device of claim 17, wherein the alert is associated with a location of an entity being monitored, a change in a movement pattern of the entity, a deviation from an anticipated movement pattern of the entity, a lack of movement of the entity, biological data associated with the entity, or a combination thereof.

19. The computer-readable storage device of claim 17, wherein the operations further comprise comparing the data to information associated with the alert conditions.

20. The computer-readable storage device of claim 17, wherein the operations further comprise:
receiving a request from a third party based on determining that the alert conditions are satisfied; and
sending a signal to the set-top box device based on the request, wherein the signal enables an adjustment of the video camera.

* * * * *